United States Patent

Lewis

[15] 3,685,892

[45] Aug. 22, 1972

[54] TONE ARM AUTOMATIC RESET MECHANISM FOR AN AUDIO-VISUAL DEVICE

[72] Inventor: Alan G. Lewis, 2700 Rainier Place, West Linn, Oreg. 97068

[22] Filed: Sept. 18, 1970

[21] Appl. No.: 73,562

[52] U.S. Cl. ..........................353/19, 353/7, 353/120

[51] Int. Cl. ..............................................G03b 31/06

[58] Field of Search............353/7, 15, 16, 17, 18, 19, 353/120

[56] References Cited

UNITED STATES PATENTS

| | | | |
|---|---|---|---|
| 3,432,230 | 3/1969 | Glass et al. | 353/120 |
| 3,484,160 | 12/1969 | Glass et al. | 353/7 |
| 3,504,445 | 4/1970 | Goldmark et al. | 353/120 |
| 3,583,808 | 6/1971 | Glass | 353/15 |

*Primary Examiner*—William D. Martin, Jr.
*Attorney*—McDougall, Hersh & Scott

[57] ABSTRACT

The audio-visual device includes a slot for receiving an audio-visual unit consisting of a transparency disk and a record rotatably mounted from the disk. A mechanism serves TO index the tone arm for playing successive spaced messages on the record in response to movement of a manually operated arm which advances the transparency disk for viewing of successive transparencies. A reset mechanism is associated with the indexing mechanism for returning the tone arm to a starting position. A tripping mechanism cooperates with the reset mechanism to release the tone arm; this tripping mechanism is actuated by a projection on the transparency disk as the latter is moved to its starting position.

8 Claims, 8 Drawing Figures

INVENTOR
Alan G. Lewis
by McDougall, Hersh & Scott
Attys

TONE ARM AUTOMATIC RESET MECHANISM FOR AN AUDIO-VISUAL DEVICE

BACKGROUND OF THE INVENTION

An audio-visual device is disclosed and claimed in U.S. Pat. No. 3,484,160 in the name of Marvin I. Glass and Gunars Licitis and assigned to Marvin Glass & Associates. The device shown in that patent includes a slot for removably receiving an audio-visual unit consisting of a disk supporting a plurality of transparencies and also rotatably mounting a record in parallel adjacent relationship with the disk. The Glass et al. device includes a manually operated lever for incrementally advancing the disk to present successive pairs of transparencies for stereo viewing. This lever also operates indexing mechanism for positioning the audio tone arm to play separate spaced messages on the record in synchronization with the pairs of transparencies being viewed. A manually operated reset mechanism is provided to return the tone arm to its starting position at the end of an audio-visual sequence.

According to the aforementioned Glass et al. device, the reset mechanism must be actuated prior to the time the transparency disk is advanced from its initial or starting position to its position for viewing the second pair of image transparencies. If the reset mechanism is not actuated prior to this time, synchronization between the audio messages and the image transparencies will be lost and can be restored only by actuation of the reset mechanism, removal of the audio-visual unit at least partially from the device, and repositioning of the transparency disk to its initial or starting position.

According to the present invention, means are provided for automatically tripping or actuating the reset mechanism in response to movement of the transparency disk to its initial or starting position. When using an audio-visual device embodying the present invention, the user need be concerned only with manipulation of a single operating member which advances the transparency disk.

OBJECTS OF THE INVENTION

A primary object of the present invention is the provision of means for automatically resetting a tone arm in an audio-visual device.

Another object of the present invention is to provide means for automatically resetting a tone arm in an audio-visual device, wherein such means are actuated to reset the tone arm in response to movement of a transparency holder to its starting position.

Still another object of the present invention is to provide means for automatically resetting a tone arm in an audio-visual device, wherein such device is adapted to receive an audio-visual unit consisting of a disk mounting a plurality of transparencies and also rotatably mounting a record, which disk includes a lug for automatically actuating tripping mechanism in the course of movement of such disk to its starting position.

These and other object and advantages of the invention will become apparent from the following specification disclosing a preferred embodiment shown in the accompanying drawings.

DESCRIPTION OF A PREFERRED EMBODIMENT

Figure 1:
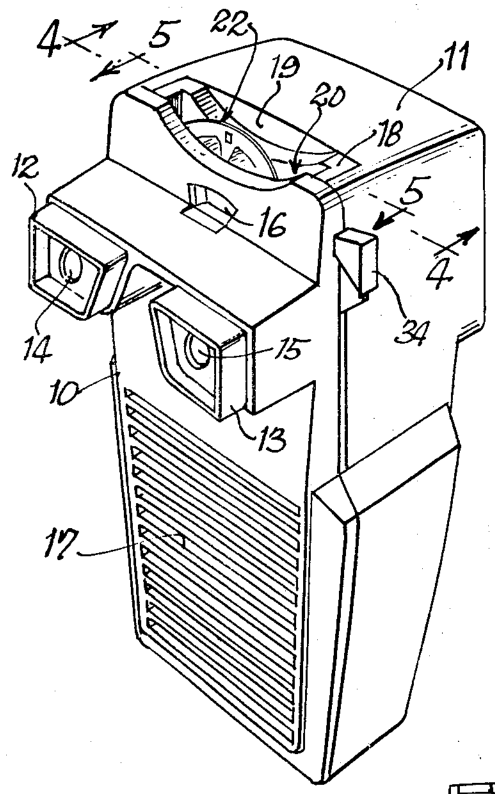
FIG. 1 is a perspective view of an audio-visual unit embodying the present invention.

Referring primarily to FIG. 1, an audio-visual device embodying the present invention includes a housing having a front section or shell 10 and a rear section or shell 11 suitably connected to each other. The housing section 10 includes a pair of integral tubular extensions 12 and 13 mounting respective windows 14 and 15. The windows 14 and 15 are spaced apart a distance to accommodate an average pair of human eyes for viewing stereo transparency pairs. The front section 10 further includes a window 16 to permit viewing of certain indicia as will be explained below. Finally, the housing section 10 includes a grille 17 disposed over an amplifier cone (not shown).

The front housing section 10 mounts a subhousing member or plate 18, the upper portion of the latter being received within a recess 19 formed in the top wall of the housing shell 11. The plate 18 cooperates with the housing section 10 to define an opening or slot, generally designated 20, for removably receiving an audio-visual unit, generally designated 22.

The audio-visual unit, which is preferably of the type disclosed and claimed in U.S. Pat. No. 3,423,230 in the name of Marvin I. Glass and Gunars Licitis, and assigned to Marvin Glass & Associates, includes a disk 23 which may be of laminated construction and which has a plurality of circumferentially spaced openings 24 mounting photographic image transparencies. In the embodiment shown for purposes of illustration, the disk 23 mounts seven pairs of transparencies for stereo viewing. The disk 23 further includes seven equally spaced slots 25 for receiving certain members which cooperate to advance the disk as will be explained below. As noted in FIG. 2, the disk 23 includes indicia in the form of an arrow 27 which indicates to the user the angular disposition of the disk 23 should occupy when being inserted in the slot 20 of the housing.

The disk 23 carries a hub 28 at its center, which hub rotatably mounts a sound reproducing record 30. The peripheral portion of the record 30 extends over the image transparencies; accordingly, the record is made of translucent material to permit passage of light through the record as well as the transparencies mounted on the disk 23. It will be understood that the record grooves are on the face of the record 30 opposite the face thereof which is adjacent the disk 23. Reference may be had to the aforementioned Glass et al. U.S. Pat. No. 3,423,230 for a more detailed description of the audio-visual unit 22.

Figure 4:
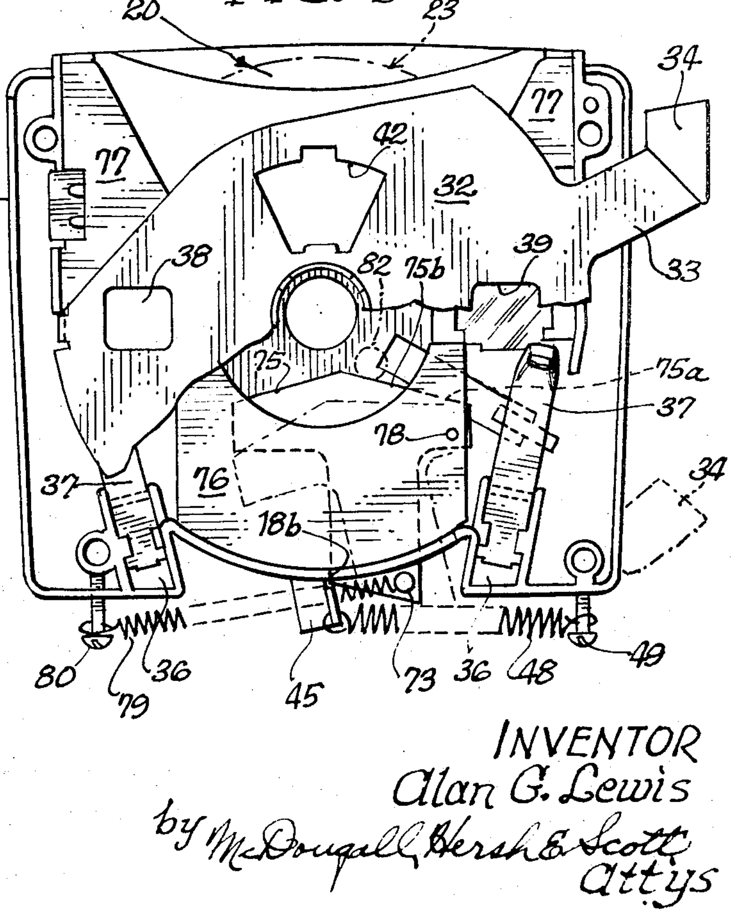
FIG. 4 is an enlarged view taken along the line 4—4 of FIG. 1, but showing only certain of the internal components of the audio-visual device.

Referring to FIG. 4, a transparency advance plate 32 cooperates with the plate 18 to define a space communicating with the opening 20 for reception of the audio-visual unit 22. The plate 32 includes an integral actuating arm 33 with a finger engaging button 34 on the distal end thereof. The plate 32 is mounted for rotation about its center for swinging movement through an arc represented by the solid and phantom line positions of the button 34. It will be understood that the plate 32 includes a yieldable finger (not shown) for one-at-a-time engagement with the openings 25 in the disk 23 for rotating the latter to present successive pairs of transparencies for stereo viewing in response to manual operation of the button 34.

The plate 18 includes integral wall means defining cavities 36 receiving the lower ends of spring fingers 37 which yieldably engage respectively a pair of openings 25 in the disk 23 to prevent retrograde movement of the latter during return (upper) movement of the operating button 34. Suitable spring means (not shown) are provided to hold the carrier plate 32 in the position shown in FIG. 4.

Figure 2:
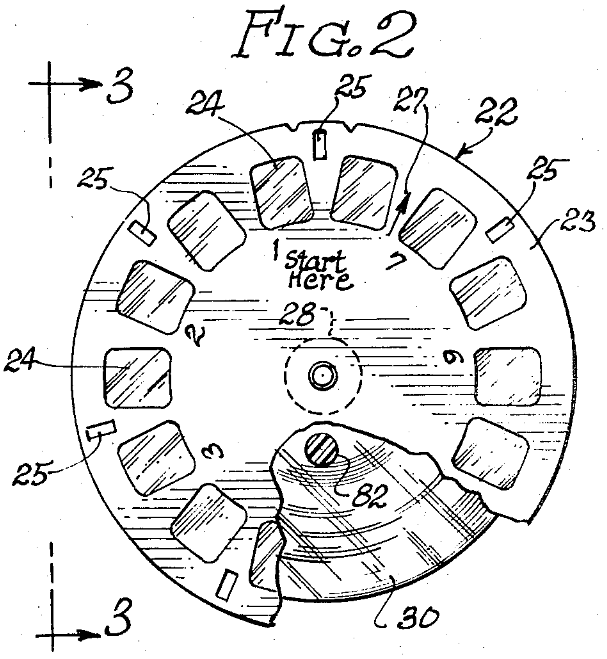
FIG. 2 is an enlarged elevation of the audio-visual unit with a portion of the transparency holder being broken away.
Figure 3:
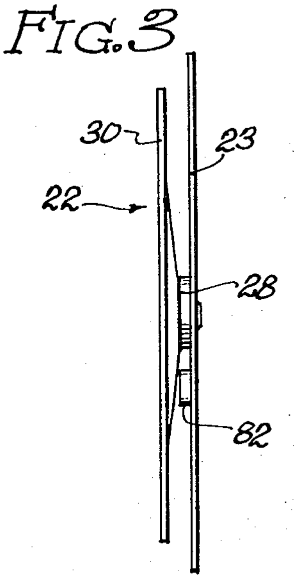
FIG. 3 is a side elevation of the audio-visual unit taken along the line 3—3 of FIG. 2.

The plate 32 includes a pair of openings 38, 39 located for alignment with respective windows 14, 15 when the plate 32 is in the position illustrated in FIG. 4. As noted in FIG. 5, the plate 18 has a pair of windows 40, 41 positioned on the optical axes defined by the windows 14, 15. The plate 32 includes another window 42 which is in alignment with the window 16 when the plate 32 is in the position illustrated; the windows 16, 42 permit the user to view indicia on the disk 23, such as "Start Here" as seen in FIG. 2.

Figures 5, 6, 7, 8:
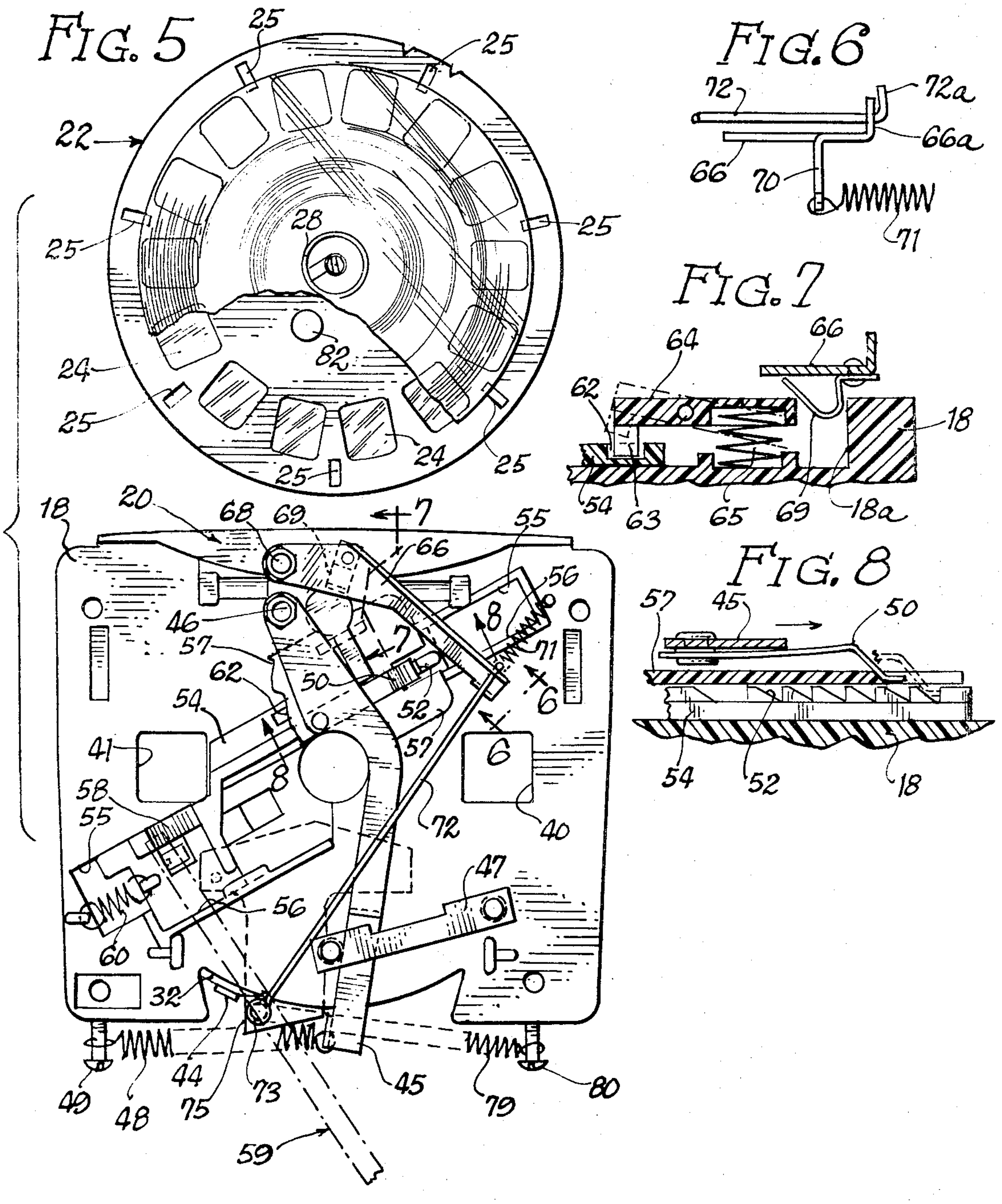
FIG. 5 is a view taken along the line 5—5 of FIG. 1, but showing only certain internal components and the audio-visual unit positioned over the slot therefor in the housing of the audio-visual device.
FIG. 6 is an enlarged view taken along the line 6—6 of FIG. 5.
FIG. 7 is an enlarged section taken along the line 7—7 of FIG. 5.
FIG. 8 is an enlarged section taken along the line 8—8 of FIG. 5.

As noted in FIG. 5, the plate 32 includes an integral lug 44 which is adapted to abut one end of an advance arm 45 when the plate 32 is rotated by operation of the button 34. This movement of the lug 44 causes the arm 45 to pivot about a fastener 46, which fastener mounts the advance arm on the plate 18. A strap 47 is secured to the plate 18 and extends over the distal end of the arm 45 serving as a guide for the latter and also serving as stops to limit the amount of swinging movement of the arm 45. A coil spring 48 has one end thereof secured to the distal end of the advance arm 45 and the other end thereof secured to a fastener 49, which fastener is mounted from the plate 18. The spring 48 urges the arm 45 in a clockwise direction as viewed in FIG. 5 and normally holds the distal end of such arm against one of the stops defined by the strap 47.

The arm 45 mounts an advance pawl 50 in the form of a spring strip adapted for engagement with a rack 52, the latter being integral with an indexing slide 54. The slide 54 is mounted by suitable guideways 55, 56 for reciprocal sliding movement between the plate 18 and a cover plate 57 along a path generally diagonal of the plate 18 as seen in FIG. 5.

The slide 54 includes an integral stylus guide 58 which loosely receives the distal end of a tone arm 59, the latter mounting a suitable stylus or needle for engaging the grooves in the record 30. A spring 60 has one of its ends connected to the slide 54 and the other of its ends suitably absorbed to the plate 18; this spring urges the slide 54 downwardly and to the left as viewed in FIG. 5 for returning the tone arm to its starting position adjacent the outermost groove on the record.

The slide 54 includes another rack 62 in parallel adjacent relationship with the rack 52. The teeth on the rack 62 are engaged by a finger 63 of a pawl 64, the latter being mounted for limited pivotal movement as seen in FIG. 7. A spring 65 acts against the pawl for yieldably holding the finger 63 in engagement with the teeth of the rack 62.

It will be appreciated that when the plate 32 is operated by the button 34 for advancing a successive pair of transparencies for viewing, the advance arm 45 is rocked for indexing or advancing the slide 54 as a result of engagement of the spring pawl 50 with one of the teeth on the rack 52. The spring biased finger 63 engages one of the teeth on the rack 62 to prevent retrograde movement of the slide 54; in other words, the pawl 64 acts against the spring 60 to prevent return movement of the slide 54.

Indexing of the slide 54 causes the tone arm 59 to be positioned in alignment with the starting groove of a successive message on the record 30. Suitable means (not shown) are provided to bring the needle into engagement with the record. Because of the mechanical interconnection between the transparency advance mechanism and the indexing means for the tone arm, a record message will be played in synchronization with the corresponding pair of image transparencies. Reference may be had to the aforementioned Glass et al. U.S. Pat. No. 3,484,160 for a detailed description of the audio-visual device in which the present invention may be embodied. It will be understood that the device shown in such Glass et al. patent is provided with a manually operated button or lever for pivoting the pawl 64 against the force of the spring 65 to disengage the finger 63 from the rack 62 so as to permit the spring 60 to return the slide 54 and thereby reset the tone arm 59 to its starting position.

The present invention includes an arm 66 pivotally mounted at one end thereof to the plate 18 by means of a fastener 68. This arm mounts a spring finger 69 for engaging the pawl 64 to rock the same as shown in FIG. 7 thereby to disengage the finger 63 from the rack 62. The distal end of the arm 66 has an integral depending lug 70 engaged by a spring 71 which is anchored to the plate 18. The spring 71 urges the arm 66 in counterclockwise direction as viewed in FIG. 5 for holding the finger 69 in abutting engagement with a wall surface **18*a* of the plate 18 as seen in FIG. 7**.

A spring wire 72 has an end **72*a* thereof upturned and received in an aperture formed in an upstanding rib 66*a*, the latter being integral with the arm 66. The other end of the spring wire 72 is pivotally mounted, as by means of a pin 73, to a tripping plate 75**.

The tripping plate is contained between a pair of partition plates mounted by the housing plate 18; one of such partition plates is illustrated and is designated 76. The partition plates 76 are substantially coplanar with a pair of other partition plates 77, all of which partition plates extend between the transparency disk 23 and the record 30 when the unit 22 is operatively mounted within the audio-visual device.

The tripping plate has an integral ear 75$a$ receiving a pin 78 mounted by the partition plates. It will be understood that the tripping plate 75 is mounted for swinging movement about the pin 78 between the solid and broken line positions as shown in FIG. 4. A spring 79 has one end thereof connected to the pin 73 and the other end thereof anchored by a fastener 80, which fastener is mounted from the plate 18. The spring 79 urges the tripping plate 75 in a clockwise direction as viewed in FIG. 4 holding an edge of the tripping plate in abutting engagement with a stop 18$b$ formed by a wall surface on the plate 18. It will be observed that the uppermost edge of the tripping plate 75 is peaked to form a cam surface 75$b$.

Referring to FIGS. 2, 4 and 5, it is seen that a projection or lug 82 is secured to the transparency disk 23. This lug may be made of plastic material and is shown in the form of a small cylinder; this lug could be made in the form of a cam lobe integral with the hub 28. The lug 82 projects from the face of the disk 23 which is adjacent the record and extends into the space between the transparency disk and the record. The lug 82 does not engage the record 30 and does not interfere with rotation of the latter relative to the transparency disk 23.

When it is desired to commence an audio-visual sequence, the user inserts the unit 22 into the slot 20 with the disk 23 oriented such that the arrow 27 occupies a vertical position. When the disk 23 is so oriented, the projection 82 will occupy the position as best seen in FIG. 5. The user then depresses the button 34 which rotates the disk 23 through one-fourteenth of a complete revolution thereby positioning the first pair of transparencies on the optical axes. During this initial positioning of the disk 23, the latter moves through an arcuate amount which is only one-half the arcuate amount of movement of the plate 32 because of a lost motion result which is obtained by movement of the member 32 prior to the time the advance finger engages one of the openings 25. During subsequent actuation of the plate 32, the latter as well as the disk 23 move in unison through one-seventh of a revolution.

During the aforementioned initial movement of the disk 23, the latter rotates such that the lug 82 moves from the broken to the solid line position thereof as seen in FIG. 4. This causes the lug 82 to engage the edge 75$b$ on the tripping plate 75 to rock the latter for pulling the spring wire 72 and thereby swinging the arm 66 such that the spring 69 engages the pawl 64 for disengaging the finger 63 from the rack 62. When the rack 62 is released, the spring 60 acts to return the slide 54 and reset the tone arm to its starting position.

Accordingly, it will be apparent that as the operating member 34 is actuated to establish initial positioning of the transparency disk 23, the tone arm will be automatically reset to its starting position adjacent the outermost groove on the record 30. It is also apparent that the tripping mechanism could be adapted to actuate the reset mechanism in response to lowering of the disk 23 into its slot, i.e., before the disk is rotated. In fact, if the disk 23 is inserted with the first pair of transparencies in the viewing position (in which case the arrow 27 will not be in the vertical position but will be disposed as seen in FIG. 2), the tripping mechanism will be immediately actuated.

At the end of an audio-visual sequence, i.e., after the seven pairs of transparencies have been viewed and the corresponding seven messages have been heard, if the user desires to repeat the same audio-visual sequence, the button 34 is depressed again to bring the first pair of transparencies into alignment with the optical axes whereupon the lug 82 will serve to actuate the tripping mechanism and automatically reset the tone arm. The present invention obviates the use of a separate control for the reset mechanism and prevents the messages from being played out of synchronization with the transparencies being viewed.

For purposes of illustration, the invention has been shown as embodied in the audio-visual device disclosed in the aforementioned Glass et al. U.S. Pat. No. 3,484,160. However, it will be understood the invention is not to be limited for use with that particular device as the invention has applicability in other audio-visual devices.

I claim:

1. In an audio-visual device of the type adapted to receive a record and a transparency holder, wherein such device includes a tone arm and reset means for returning the tone arm to a starting position, the improvement for automatically resetting the tone arm in response to movement of the transparency holder to its starting position comprising, a tripping mechanism cooperating with said reset means for releasing the tone arm upon actuation of the tripping mechanism, said tripping mechanism including a member movable back and forth between first and second positions, which member serves to actuate said tripping mechanism when in said first position thereof, means mounting said member for being engaged by an element on the transparency holder and for being moved thereby from said second position to said first position in response to movement of said transparency holder to its starting position.

2. In an audio-visual device, the improvement comprising:

a. a transparency holder mounting a series of transparencies and including a formation in predetermined spatial relationship with such transparencies;

b. a housing having means for operably supporting a record and said transparency holder and mounting the latter for movement to and from a starting position;

c. a tone arm and reset means for returning the tone arm to a starting position;

d. a tripping mechanism cooperating with said reset means for releasing the tone arm to return the same to its starting position upon actuation of the tripping mechanism; and e. a member associated with said tripping mechanism and movable back and forth between first and second positions, which member serves to actuate said tripping mechanism when in said first position thereof, said member being engaged by said formation on the transparency holder for being moved thereby from said second position to said first position in response to movement of the transparency holder to its starting position.

3. In an audio-visual device, the improvement comprising:

a. a transparency holder mounting a series of transparencies and including a formation in predetermined spatial relationship with such transparencies;
b. a housing having an opening for removably receiving said transparency holder;
c. advancing means in the housing for moving said holder to and from a starting position;
d. a tone arm and reset means for returning the tone arm to a starting position;
e. a tripping mechanism cooperating with said reset means for releasing the tone arm to return to its starting position upon actuation of the tripping mechanism; and
f. a member associated with said tripping mechanism and movable back and forth between first and second positions, which member serves to actuate said tripping mechanism when in said first position thereof, said member being mounted adjacent the housing opening for being engaged by said formation and moved thereby from said second position to said first position in response to movement of the transparency holder to its starting position.

4. The improvement according to claim 3 further defined by:
a. indexing means for advancing said tone arm in response to operation of said advancing means;
b. biasing means connected with said indexing means for returning said tone arm to its starting position;
c. a rack movable with said indexing mechanism and a pawl engaged with the rack for holding the indexing mechanism in opposition to said biasing means;
d. an arm mounted adjacent said pawl for disengaging the latter from said rack; and
e. said member being connected with said arm for moving the latter to disengage said pawl from said rack when said member is moved to said first position thereof.

5. The improvement according to claim 3 further defined by biasing means urging said member from its first position to its second position.

6. The improvement according to claim 3 wherein said transparency holder is defined by a planar element mounting said transparencies in coplanar relationship therewith, said disk having a hub at its center rotatably mounting said record in parallel adjacent relationship with said planar element, said formation being defined by a lug mounted on said planar element.

7. The improvement according to claim 6 wherein said formation is defined by a lug mounted on said planar element and projecting from the face thereof adjacent said record and extending into the space between said planar element and said record.

8. The improvement according to claim 7 further defined by:
a. indexing means for advancing said tone arm in response to operation of said advancing means;
b. biasing means connected with said indexing means for returning said tone arm to its starting position;
c. a rack movable with said indexing means and a pawl releasably engaged with the rack for holding the indexing means in opposition to said biasing means;
d. an arm mounted adjacent said pawl for disengaging the latter from said rack; and
e. said member being connected with said arm for moving the latter to disengage said pawl when said member is moved to said first position thereof.

* * * * *